(12) United States Patent
Joshi et al.

(10) Patent No.: US 12,033,216 B1
(45) Date of Patent: Jul. 9, 2024

(54) SYSTEM AND METHOD FOR A MACHINE LEARNING SERVICE

(71) Applicant: Morgan Stanley Services Group Inc., New York, NY (US)

(72) Inventors: Ankita Joshi, Karnataka (IN); Ashish Singh, Karnataka (IN); Manoj Arora, East Brunswick, NJ (US); Poojan Turakhia, Maharashtra (IN); Jeff Preston, New York, NY (US); Frank Hong, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/320,752

(22) Filed: May 19, 2023

(51) Int. Cl.
*G06Q 40/06* (2012.01)
(52) U.S. Cl.
CPC .................... *G06Q 40/06* (2013.01)
(58) Field of Classification Search
None
See application file for complete search history.

(56) References Cited

U.S. PATENT DOCUMENTS

2018/0285975 A1* 10/2018 Ewanio ............... G06F 16/9535
2021/0264520 A1* 8/2021 Cummings ............ G06Q 40/12

OTHER PUBLICATIONS

Zhang, ( MM '20: Proceedings of the 28th ACM International Conference on Multimedia, "MLModelCI: An Automatic Cloud Platform for Efficient MLaaS", Oct. 2020, pp. 4453â4456) (Year: 2020).*

* cited by examiner

*Primary Examiner* — Gregory A Pollock
(74) *Attorney, Agent, or Firm* — Leason Ellis LLP (57) ABSTRACT

A computer-implemented method for providing recommendations for matching leads to advisors using a machine learning model. The method comprises training the machine learning model using attributes of leads and advisors to determine optimal matches and output a recommendation list of lead/advisor matched pairs, serializing the machine learning model in a platform independent manner, providing access to the serialized machine learning model to an end user device via an API, deserializing the machine learning model, receiving preferences from the end user, executing the deserialized machine learning model at the end user device using the received preferences to determine a list of advisor recommendations, filtering the list of recommendations using rules which disallow certain lead/advisor pairs, outputting filtered recommendations at the end user device for viewing and transmitting a selection from the filtered recommendations from the end user for further training of the machine learning module with respect to the end user.

16 Claims, 4 Drawing Sheets

Mock Experience in Shareworks

Company Name
At Work ⊙ Dashboard ⇄ Portfolio ⇄ Activity 🗎 Documents   ✉ Ⓡ Robert Total Stock Plan Portfolio Value $195,00.00   410

⊙ Available .................................. $70,000.00
⊘ Unavailable ............................... $125,000.00   415

Jane Doe
Senior Vice President
Wealth Management
Match Score: 100

Linkedin: Linkedin.com/in/jane-doe
Undergraduate University: University of Florida
Graduate University: Stanford University
Academic Major: Business Management
Hobbies / Interests: Golf | Traveling
Previous Employers: JP Morgan ; Goldman
Languages (other than English): Korean Contact Information After Selection
590 Madison Ave
New York, NY 10022
United States
24th FL

[Select]

See More Advisors Like This One

John Doe
Senior Vice President
Wealth Management
Match Score: 100

Linkedin: Linkedin.com/in/jane-doe
Undergraduate University: Stanford University
Graduate University: Stanford University
Academic Major: Business Management
Hobbies / Interests: Golf | Traveling
Previous Employers: JP Morgan ; Goldman
Languages (other than English): Korean Contact Information After Selection
590 Madison Ave
New York, NY 10022
United States
24th FL

[Select]

See More Advisors Like This One

Jacobe Doe
Senior Vice President
Wealth Management
Match Score: 100

Linkedin: Linkedin.com/in/jane-doe
Undergraduate University: Stanford University
Graduate University: Stanford University
Academic Major: Business Management
Hobbies / Interests: Golf | Traveling
Previous Employers: JP Morgan ; Goldman
Languages (other than English): Korean Contact Information After Selection
590 Madison Ave
New York, NY 10022
United States
24th FL

[Select]

See More Advisors Like This One

405

You have no tasks right now

⊙ Available

Here's a summary of your available value.

**E*Trade**
Manage you direct accounts

Items in progress

Sale
Started January 2, 2022

[Launch]

[Processing]

FIG. 4

SYSTEM AND METHOD FOR A MACHINE LEARNING SERVICE

FIELD OF THE DISCLOSURE

The present disclosure relates to machine learning process and organizational database systems, and in particular relates to a system and method that links a machine learning algorithm with a run-time API service in order to provide a suitable run-time determination for a prospective user.

BACKGROUND OF THE DISCLOSURE

In service industries, including financial services, it is important to obtain, store and manage knowledge related to prospective clients, which are referred to as "leads". One objective of the lead management process is to match a prospective lead with the most appropriate recipient (advisor, salesperson, etc.) in an organization. Traditionally, lead management is handled by the individuals responsible for client prospecting. These individuals typically obtain information concerning leads by buying clients lists, receiving referrals, and creating web pages that collect information. In the case of large organizations, leads can also be assigned to sales personnel by assignment from a central process. While these processes have some effectiveness, the matching between the lead and advisor is based on fairly generalized rules and/or human-biased decisions that often result in sub-optimal or unsuccessful lead matching.

Machine learning techniques can aid in the matching process as such techniques can process a large number of relevant features and attributes, related to both clients and potential advisors, and determine an optimal matching solution. It is found, however, that there are circumstances which make simply incorporating data into a machine learning ecosystem infeasible, either due to data incompatibility an overly large amount of batch data or other factors. More generally, beyond the client/advisor matching process, there are instances in which a machine learning ecosystem cannot be effectively used due to such incompatibilities.

What is therefore needed is a system and method that can leverage machine learning ecosystem capabilities while accommodating data sets that cannot be directly used during as inputs to the learning phase of a machine learning processing model.

SUMMARY OF THE DISCLOSURE

According to one aspect, a computer-implemented method of providing recommendations for matching leads to financial advisors using a machine learning model is provided. The method, executed by one or more hardware processing units of a computing system comprises training the machine learning model using known attributes of the leads and advisors to determine optimal lead/advisor matches and to output an initial recommendation list of lead/advisor matched pairs, serializing the machine learning model in a platform independent manner, providing access to the serialized machine learning model to an end user device via an application program interface, deserializing the machine learning model, receiving preferences from the end user regarding a preferred financial advisor, executing the deserialized machine learning model at the end user device using the received preferences to determine a list of advisor recommendations tailored for the end user, filtering the list of advisor recommendations using business rules and protocols which disallow certain lead/advisor pairings, outputting a representation of the filtered recommendations at the end user device for viewing by a particular end user and transmitting a selection from the filtered recommendations from the end user device for further training of the machine learning module with respect to the particular end user. In some embodiments, the one or more processors are further configured with a machine learning algorithm that receives as inputs knowledge graphs, historical and streamed data, and is trained learn the status of relationships between entities.

According to another aspect, a computer system for providing recommendations for matching leads to and financial advisors using a machine learning model is provided. The system, implemented on one or more computer processing units, comprises a system component configured to train the machine learning model using known attributes of the leads and advisors to determine optimal lead/advisor matches and to output an initial recommendation list of lead/advisor matched pairs, and an interfacing component coupled to the system component and configured to serialize the machine learning model in a platform independent manner, provide access to the serialized machine learning model to an end user device via an application program interface, deserialize the machine learning model and provide responses to the end user device via services, receive preferences from the end user regarding a preferred financial advisor and provide the system component with the received preferences for further training of the machine learning model. The deserialized machine learning model is executed on the end user device using the received preferences to determine a list of advisor recommendations tailored for the end user.

DESCRIPTION OF CERTAIN EMBODIMENTS OF THE DISCLOSURE

The present disclosure describes a machine learning-query-on-demand system and method that provides an out-facing interface to prospective leads and other users, allowing users to input, refine requests and obtain match (e.g., recommendation) determinations in real time. Importantly user, can further refine proposed advisor matches without direct connection to the lead-management ecosystem. This service enables virtually unlimited scale of client/advisory recommendations at near real-time speeds.

Figure 1:
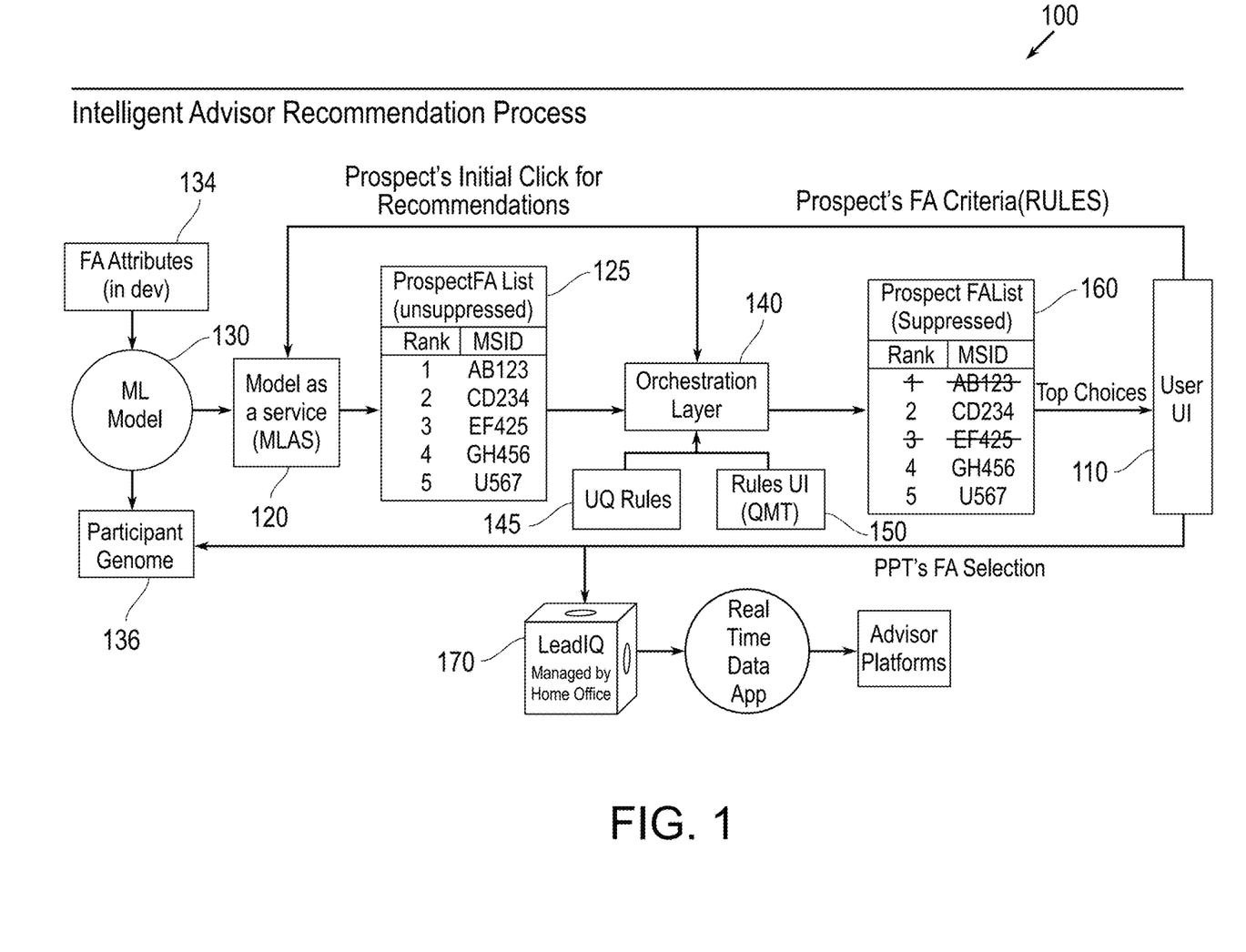
FIG. 1 is a schematic diagram that illustrates an embodiment of a matching process architecture that incorporates machine learning according to the present disclosure.

FIG. 1 is a schematic diagram that illustrates an embodiment of a matching process architecture according to the present disclosure. At a first edge of process architecture is a user interface (UI) 110 through which a lead or other user can select a prompt or widget to obtain an advisor recommendation or locate an advisor. Information entered into the UI 110 by the user is delivered to a machine learning as-a service (MLAS) application interface 120. As described in greater detail below, the MLAS 120 encapsulates and sends the received lead information in a bundled structure (e.g., MLeap bundle) to a machine learning model API utility which is configured to execute one or more machine learning models 130 (collectively the "ML model"). The ML model 130 is trained using lead and advisor information obtained from a participant genome 134 and advisor attributes 136 to provide an optimal advisor recommendation for a selected lead. The training can be supervised by employing a record of previous successful lead/advisor matches. The training of the ML model 130 does not necessarily occur in real time. Rather, the initial training phase is a batch process that uses large amounts of participant (lead) and advisor data and can take place over night. The participant genome and advisor attribute can encompass tens or even hundreds of different characteristics and attributes of the lead and advisors including income levels, years of experience, geographic location. The results generated by the ML model 130 are formatted by the MLAS into a first lead/advisor pairing list 125 which returns a score for every applicable lead/advisor pairing. The first pairing list is delivered to an orchestration layer 140 of the system which enables scheduling and monitoring of sequential and parallel workflows as well as database management.

Figure 4:
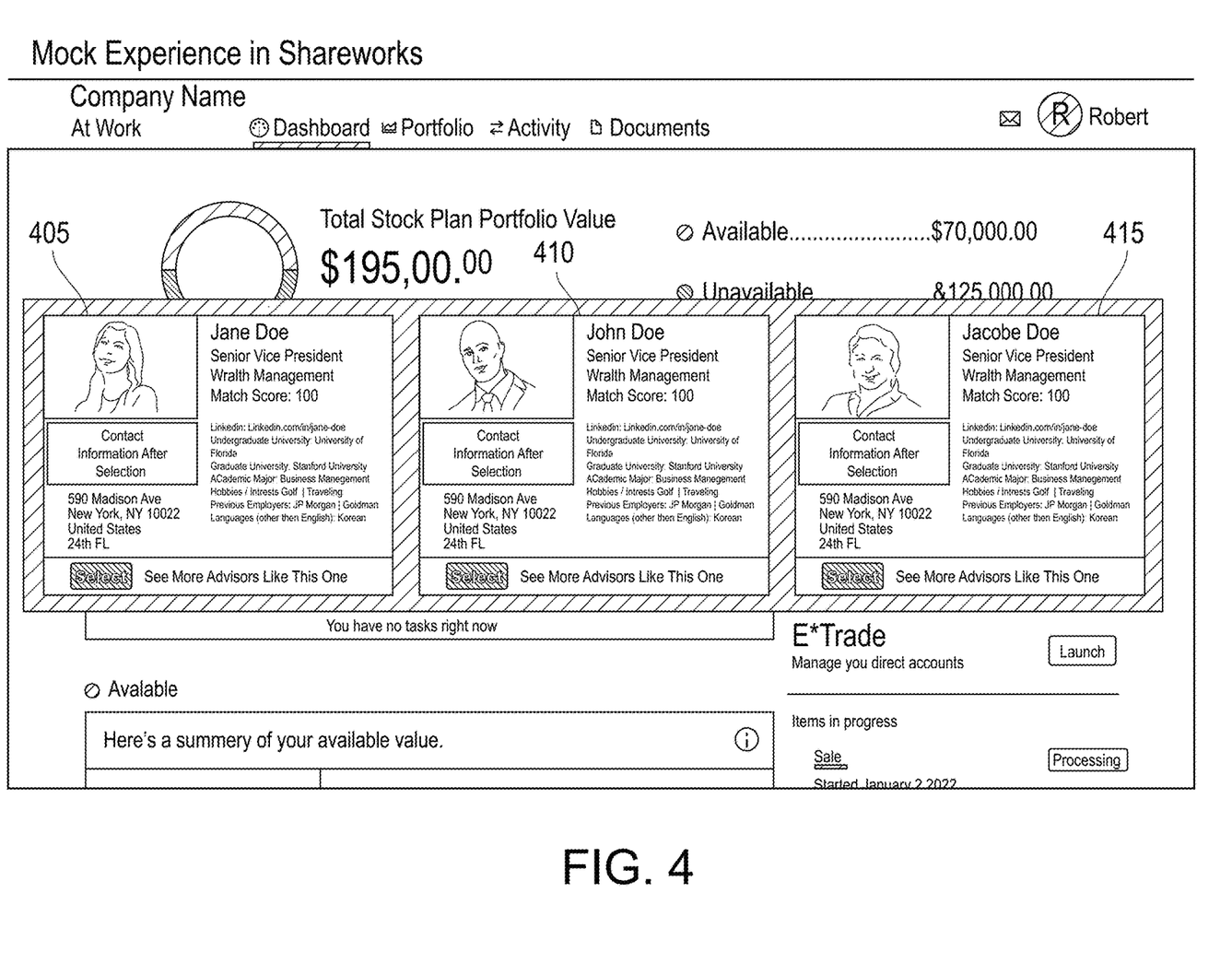
FIG. 4 is an exemplary screen output by the MLAS service at a user interface for run time advisory recommendation according to an embodiment of the present disclosure.

At the UI 110, the user is prompted to enter any criteria/preferences that they may have for a preferred advisor. The orchestration layer receives the preference information and then accesses a rules engine 145, which can be implemented using a query management tool, to apply a set of rules to the criteria and preferences. The rules can include conditions for removing certain advisors as candidates for matches based on preset criteria. As one example, a lead may prefer a lead to be located within a certain geographical proximity. Based on application of these criteria, the rules engine 145 returns a second list of lead/advisory pairs that match the criteria and preferences of the user. In parallel, the orchestration layer 140 takes the raw scored lead-advisor paring list 125 and applies further existing business protocols 150 that also can suppress out advisors from the list that do not meet a set of propriety business rules, resulting in a refined pairing list. For example, a business protocol might exclude a particular advisor on the basis that the selected advisor is already responsible for a threshold number of clients. The refined list is combined by the orchestration layer 140 with the second list generated by the via the rules engine 145. This combination removes any advisors that do not meet the criteria of the preferences, rules and business protocols. After the recommendations have been completed, a finalized list 160 is passed with corresponding management system information describing the advisor to the UI 110. At the UI 110, a predefined number of top advisor recommendations are presented to the lead in a visualization (an example is shown in FIG. 4). The lead can utilize the UI to select a preferred advisor from the presented advisors shown in the UI.

Upon selection of an advisor by the lead, the lead-advisor pair that is selected along with additional, applicable data is passed to a lead internal database management system 170 (referred to as "LeadIQ") which, in response, assigns the lead data record to the selected advisor. Assignment within the LeadIQ system 170 enables the selected advisor to be alerted of the selection and to view the available data concerning the lead in existing advisor platforms (e.g., customer relationship management (CRM), next-best-action (NBA) platforms). The LeadIQ system 170 also triggers a real-time data application, which in some implementations can be in the form of an API service that delivers key data elements of the lead's information to specific advisor platforms, allowing the advisors to view and take action on the data in real-time.

Figure 2:
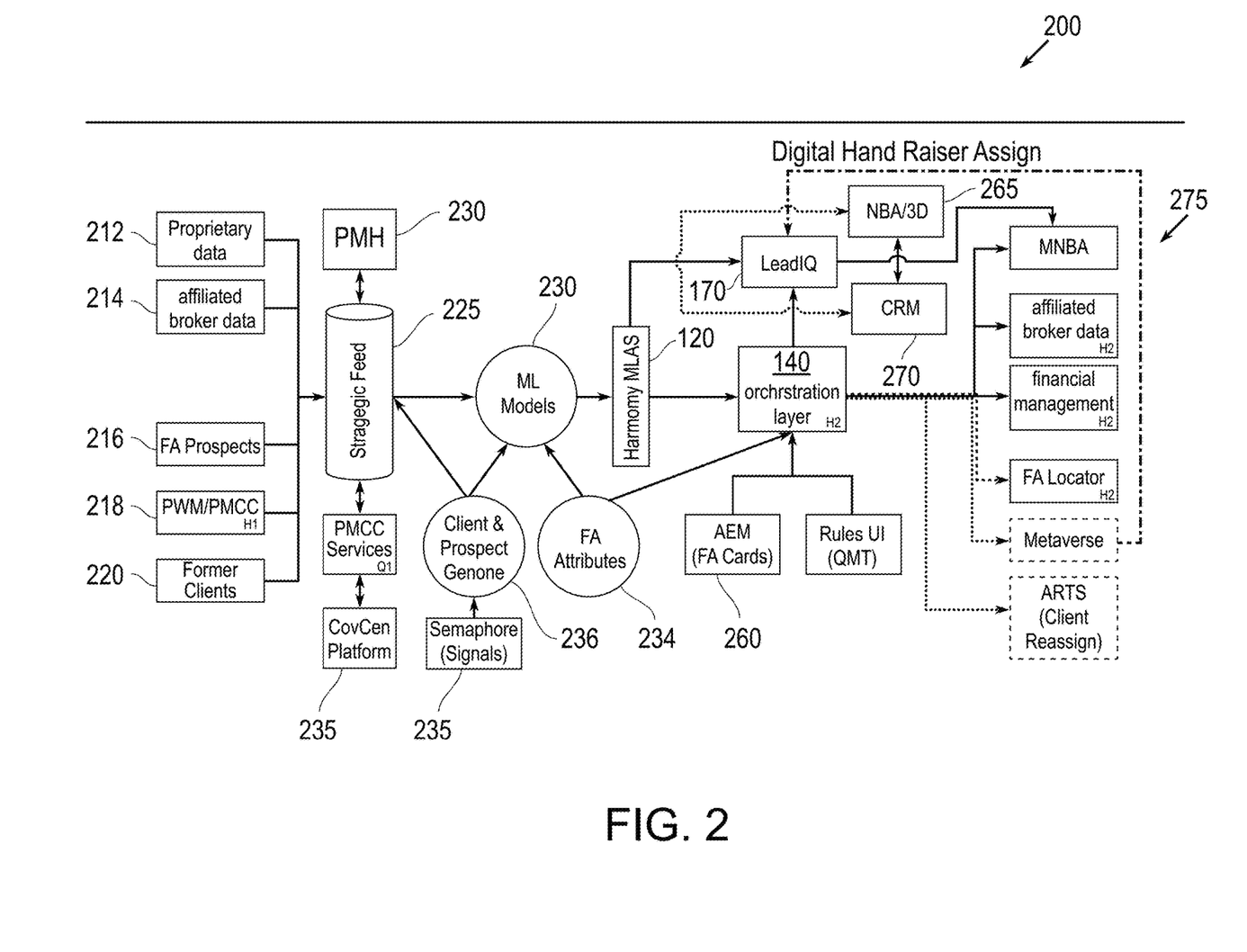
FIG. 2 is a schematic diagram of an embodiment of an intelligent advisor recommendation and advisor ecosystem that supplements the flow diagram shown in FIG. 1.

FIG. 2 is a schematic diagram of an embodiment of an intelligent advisor recommendation and advisor ecosystem that supplements the flow diagram shown in FIG. 1. The sources of the data used in the lead/advisor recommendation process are received into the ecosystem in which the data can be standardized, maintained, and used for analysis and determinations. The data sources include MS data 212 which constitutes proprietary data such as, but not limited to, such information as stock plans, financial wellness and retirement data, and lists of leads originating from the business-to-business activities of internal organization departments. Affiliated online broker information 214 includes information pertaining to retail clients that can be considered prospective leads. FA prospect information 216 pertains to prospects originated by financial advisors that is stored in disparate data stores; PWM sources 218 include store centrally managed lead information and former client 220 is a separate source contain information on former clients.

The data sources 212-220 are input into a strategic feed 225 which is database consisting of a number of centralized, standardized, and cultivated tables that are accessible to all platforms in the ecosystem and comprise the governing data source for leads in the ecosystem. A party master hub 230 is a database which is used to store critical production attributes of current clients and leads. The party master hub 230 also serves as a centralized data base for all downstream systems and is coupled to the strategic feed 225. A central coverage platform 235, coupled to the strategic feed 225, is a prospect management and control system that is configured to prevent the access to lead and advisor data to unauthorized personnel. PMCC services 240 are operatively connected to the central coverage platform and include enterprise search services that enable downstream systems to perform coverage central checks in real time.

The client and lead genome 136 (shown in FIG. 1 as well) is a database that includes demographic and account information, individual engagement information. as well as lead web activity. Financial Advisor (FA) Attributes 134 (from FIG. 1) is a database that includes advisor attributes gathered from disparate data sources to consolidate advisor demographic, person, business, and client-centric data as well as advisors' historical client/prospect engagement, business growth, prospect conversion, etc. The FA attributes and client and lead genome 136 are linked to the suite of machine learning models 130 that score all unassigned prospects against all advisors either across the firm or within a pre-defined, select population for a given use case. As noted above and discussed further below, the MLAS service 120 enables the suite of ML models 130 to run at real-time against a specific individual prospect matching query at an end user.

The orchestration engine 140 receives raw model scores, business rules, lead preferences, and hosted advisor information data, organizes the combined information, and outputs the finalized recommendation to end-user Interface 120. As previously noted, the LeadIQ 170 is a platform that centralizes lead assignment to advisors as well as lead-FA relationship monitoring and management. Advisor information cards 260 are provisioned by a management application that hosts published content for downstream application use. Advisor information cards 260 are published for use in the lead user interfaces as additional information presented for decision making. Further tools of the ecosystem that operate in connection with the LeadIQ platform include a next-best-action/3D advisor hub 265 that provides tools to advisors for monitoring, management, and engagement of clients and leads, a customer relationship management and cloud platform 270, and end user platforms 275 which can host or provide an interface to the MLAS service for advisor recommendations.

Figure 3:
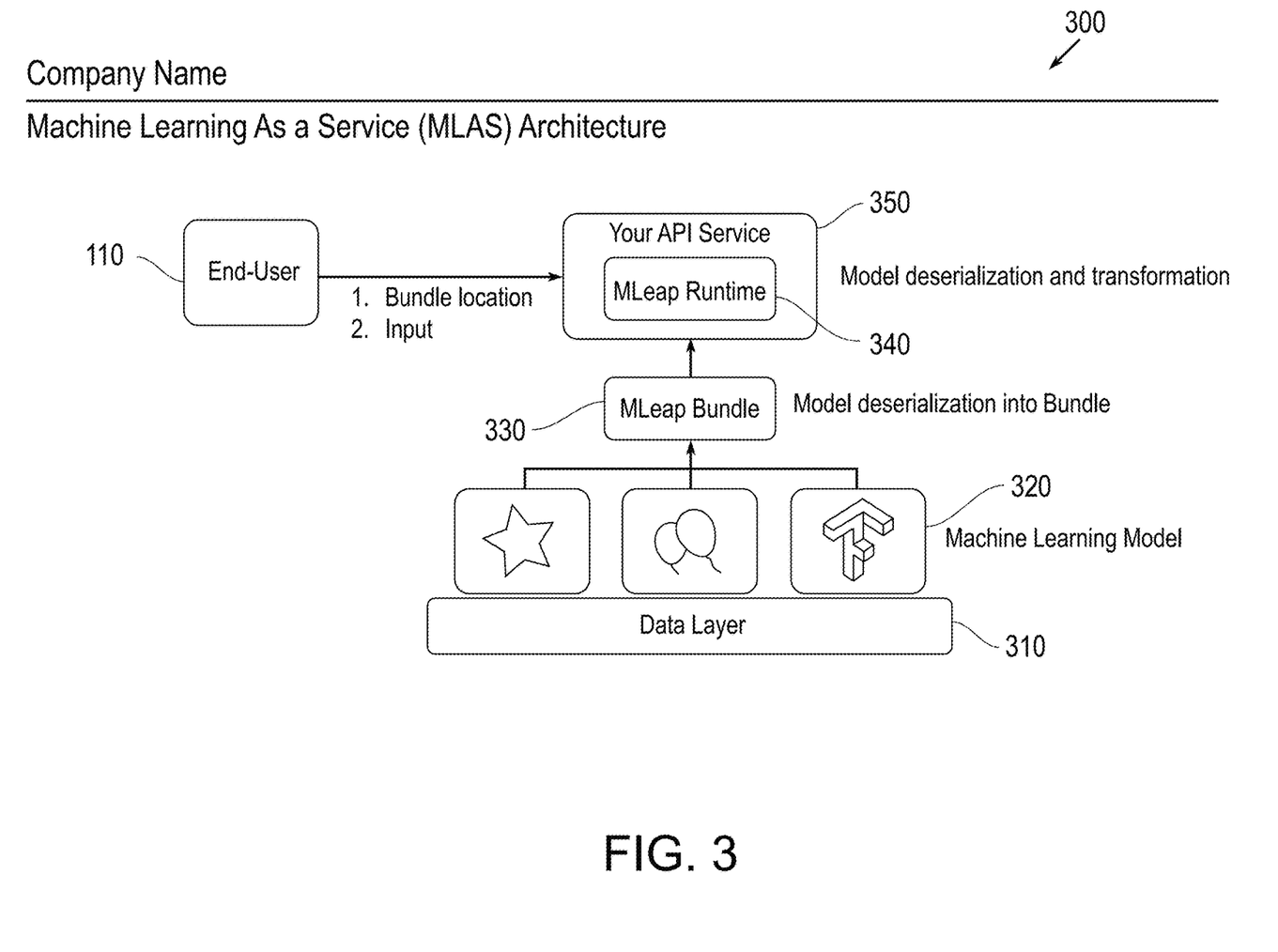
FIG. 3 is a schematic diagram of a machine learning as a service (MLAS) architecture according to an embodiment of the present disclosure.

FIG. 3 is a schematic diagram of a machine learning as a service (MLAS) architecture according to an embodiment of the present disclosure. The MLAS architecture enables the development of machine learning pipeline models that can be used to optimize lead-advisory matching (and other applications) and also performs serialization of data structures which make the pipeline models platform-independent and freely portable. These features provide for real-time execution of the lead-advisory matching algorithm from a user interface as shown in FIG. 1. At the base of the MLAS architecture is a data layer 310 that includes the raw data upon which the determinations are based, including, but not limited to, the data sources shown in FIG. 2. The data can be stored in distributed databases, on a cloud or local platform. Above the data layer 310 is a machine learning model layer ("model layer") 320 that includes platforms for developing, training and executing machine learning algorithms. For example, as shown, the model layer 320 includes Apache Spark, Scikit learn, and Tensor Flow platforms, which are well-known platforms for machine learning pipeline development.

Machine learning pipeline models are end-to-end machine learning algorithms that typically incorporate data inputs, processing layers, and outputs. The pipeline models can also combine different machine learning and artificial intelligence techniques and can add boosting algorithms. More specifically, a particular pipeline model can include one or more supervised and unsupervised ML algorithms such as, but not limited to, artificial neural networks (e.g., deep learning networks, convolutional neural networks (CNNs), recurrent neural networks (RNNs)), support vector machines (SVMs), k-means and Naïve Bayes algorithms, as well as boosting algorithms such as Adam, to name a few.

A pipeline model created using any of the model platforms 320 is exported into a common portable serialization format called a "bundle" 330. A bundle 330 is a graph-based portable file format that is used for serializing and deserializing pipeline model data structures. In the serialization process, structures developed in a particular higher-level programming context such as Python or C++ are converted into lower-level bytes that are not specific to a particular programming context. Bundles thereby provide a common serialization format for a large set of ML feature extractors and algorithms that can be exported and imported across the different model platforms 320 and simplify the sharing of the results of a training pipeline. In some implementations, as shown, an MLeap library 340 is used to create the bundle 330, and to store a model pipeline in a JSON (Java Script Object Notation) or Protobuf-based (Protocol Buffer) format. MLeap 340 is an open-source execution engine that includes program modules for serializing and deserializing machine learning pipeline model code. In some implementations, the Bundle 330 is serialized to a directory or a zip file and is serialized as either pure JSON, pure Protobuf or in a mixed mode (part JSON, part Protobuf).

In a preferred implementation, the bundle 330 stores all of the information of a pipeline model object in several distinct files. A first file, referred to as "bundle.json", stores basic meta data concerning the serialization including a root/directory which contains a root transformer of the pipeline model. A second file, referred to as "model.json", stores detailed information of the pipeline model in json format. A third file, referred to as "node.json" stores information concerning pipeline model features (e.g., estimates, transformers) that are employed in specific ML platforms such as Apache Spark.

After being bundled, the pipeline model can be readily deserialized back into a model pipeline configured for one of the ML modeling platforms (e.g., Spark, Scikit Learn, TensorFlow). The deserialized bundle is agnostic with respect to any content specific to a particular platform. A deserialized pipeline model is downloadable to an end user at a UI 110 through a restful machine learning service application program interface (MLAS API) 350. The user can employ a deserialized model for execution of a pipeline model using data structures referred to as "leapframes" which are passed as distributed data for performance of real-time operations. Real time execution is implemented by the downloaded pipeline model at the user end point 110. For purposes of the lead/advisor application, an end user can execute the pipeline model described in FIG. 1 to obtain recommended lead/advisor pairings.

The MLAS API 350 acts as a calling service for ML functions with respect to the end user UI 110. The MLAS API 350 includes a machine learning as a service (MLAS) library which includes program modules that are used to execute the interactive environment so that the end user can enter instructions and execute tasks on the ML model. For example, the ML library includes modules for performing bundle deserialization, conversion of generic input parameters and schema fields into a format (e.g., leapframes) suitable for an MLeap library. The ML library also includes models for triggering the ML pipeline model for determinations and returns output in a readable format. The MLAS API 350 generates an input data set (and input schema) as a map list which is an array of strings paired with objects (string, object), calls a run model method using an ML bundle path, the input data set, and input schema, and obtains results from execution of the ML pipeline model as another map list (string, object). Through its capabilities the MLAS API 250 provides an interface for real time operations with one or more machine learning pipeline models trained on a distributed platform or even on a standalone learning-based model such as python scikit. In this manner, the MLAS is agnostic of any platform as the bundle can be ported to any platform even in the cloud such as GCP (Google Cloud Platform), AWS (Amazon Web Services), etc. This allows real-time access by all prospective leads, current clients and advisors, and enables advisor recommendations to be determined and accessed rapidly in real time.

FIG. 4 is an exemplary screen generated by the MLAS service at a user interface for real time advisory recommendation according to an embodiment of the present disclosure. The screen illustrates the output of an advisor recommendation determination by the MLAS service disclosed herein. As shown, there are three advisor information cards 405, 410, 415 presented in the interface screen that represent advisors recommended by the MLAS service using the information input by the user (e.g., lead) through the user interface, as well as the advisor information, business rules, etc. that are all taken into account in the determination of an optimal lead/advisor pairing. Activation of any cards 405-415 to above can cause an alert to be sent to the selected advisor and also causes a series of monitored events to be scheduled by the LeadIQ 170.

The system and method disclosed herein enable organizations with large legacy services with large, disparate databases to provide a computation-light machine learning interface that utilizes the organizational information to provide real time machine learning services, including, without limitation, advisor recommendation and other predictions and determinations, without requiring execution of large batch training and other computation-heavy algorithmic processes. Importantly, a number of different databases as well as specific business protocols and rules are integrated seamlessly into the machine learning service, enabling an organization to have secure and granular control over the output of the machine learning service.

The MLAS service is hosted by a provider network that is coupled to processing and storage resources. A user can access the MLAS service, using a computing device, over one or more public or private networks using one or more APIs to access data to execute instructions and store data to storage resources of the provider network. The public or private networks can include an intranet, the Internet, a cellular network, a local area network, or any other such network or combination thereof. Communication over the network can be enabled via wired or wireless connections and combinations thereof.

Examples of user devices include personal computers (PCs), cell phones, handheld messaging devices, laptop computers, set-top boxes, personal data assistants, electronic book readers, wearable electronic devices (e.g., glasses, wristbands, monitors), and the like. In some embodiments, the user may interact with the provider network via a web portal provided through the web server and application server. These services can be implemented by one or more electronic devices that can be co-located or located in different geographic locations. Each of the one or more electronic devices includes an operating system that implements executable program instructions and a computer-readable medium storing instructions that, when executed by a processor of the device, allow the device to perform its intended functions.

More generally, the methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods and algorithms described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method of providing recommendations for matching leads to financial advisors using a machine learning model, the method, executed by one or more hardware processing units of a computing system, comprising:

training the machine learning model using known attributes of the leads and advisors to determine optimal lead/advisor matches and to output an initial recommendation list of lead/advisor matched pairs;

serializing the machine learning model in a platform independent manner wherein structures developed in a high-level programming context are converted into lower-level bytes not specific to a particular programming platform using a graph-based portable file format bundle constituting a plurality of files, wherein the bundle includes a first file that stores meta data including a directory which contains a root transformer of the machine learning model, a second file that stores information detailing the machine learning model, and a third file that stores information concerning machine learning model features employed in a specific machine learning platform;

providing access to the serialized machine learning model to an end user device via an application program interface;

deserializing the machine learning model that is executed at the end user's device, into an end user-executable model that is agnostic with respect to any platform with which the end user device operates by recreating an architecture of the executable machine learning model from the serialized plurality of files;

receiving preferences from the end user regarding a preferred financial advisor;

executing the deserialized machine learning model at the end user device using the received preferences to determine a list of advisor recommendations tailored for the end user;

filtering the list of advisor recommendations using a first set of rules and a second set of business rules specific to a platform associated with the end user which disallow certain lead/advisor pairings;

outputting a representation of the filtered recommendations at the end user device for viewing by a particular end user; and transmitting a selection from the filtered recommendations from the end user device for further training of the machine learning module with respect to the particular end user.

2. The method of claim 1, further comprising:
receiving a selection of a selected advisor from the end user device; and
assigning a data record pertaining to the end user (lead) to the selected advisor.

3. The method of claim 2, further comprising entering the assigned data record into a management system for monitoring engagement of the lead by the selected advisor.

4. The method of claim 1, wherein data sources used to train the machine learning model includes at least one of stock plans, financial wellness and retirement data, and lists of leads originating from the business-to-business activities of internal organization departments.

5. The method of claim 1, wherein data sources used to train the machine learning model includes information from one or more online platforms pertaining to clients and prospects.

6. The method of claim 1, wherein data sources used to train the machine learning model includes information related to leads that is generated by financial advisors.

7. The method of claim 1, further comprising consolidating all data sources in a strategic feed database having a number of accessible and centralized tables.

8. A computer system for providing recommendations for matching leads to and financial advisors using a machine learning model, the system, implemented on one or more computer processing units, comprising: a system component configured to:

train the machine learning model using known attributes of the leads and advisors to determine optimal lead/advisor matches;

to output an initial recommendation list of lead/advisor matched pairs; and an interfacing component coupled to the system component and configured to:

serializing the machine learning model in a platform independent manner wherein structures developed in a high-level programming context are converted into lower-level bytes not specific to a particular programming platform using a graph-based portable file format bundle constituting a plurality of files, wherein the bundle includes a first file that stores meta data including a directory which contains a root transformer of the machine learning model, a second file that stores information detailing the machine learning model, and a third file that stores information concerning machine learning model features employed in a specific machine learning platform;

provide access to the serialized machine learning model to an end user device via an application program interface;

deserializing the machine learning model that is executed at the end user's device, into an end user-executable model that is agnostic with respect to any platform with which the end user device operates by recreating an architecture of the executable machine learning model from the serialized plurality of files;

execute the machine learning model, resulting in a first listing of matched end user/advisor pairs;

provide the system component with user preferences regarding a financial advisory;

receiving the preference information and the first list of matched end user/advisor at an orchestration layer of the system component, the orchestration layer applying a set of rules criteria to the preferences to create a second list of end user/advisor matches, and further applying a set of business rules specific to the platform associated with the end user to suppress certain of the matched end user/financial advisor pairs in the second list to generate a refined pairing list; and delivering the refined pair list to the end user.

9. The computer system of claim 8, wherein the system component is further configured to receive the list of advisor recommendations tailored for the end user and to apply one or more filters to the list using business rules and protocols which disallow certain lead/advisor pairings.

10. The computer system of claim 8, wherein the interfacing component is further configured to receive a selection of a selected advisor from the end user device.

11. The computer system of claim 10, wherein the system component is further configured to assign a data record pertaining to the end user (lead) to the selected advisor.

12. The computer system of claim 11, wherein the system component is further configured to enter the assigned data record into a management system for monitoring engagement of the lead by the selected advisor.

13. The computer system of claim 8, further comprising a data source accessible by the system component for training the machine learning model, the data source including at least one of stock plans, financial wellness and retirement data, and lists of leads originating from the business-to-business activities of internal organization departments.

14. The computer system of claim 8, method of claim 1, further comprising a data source accessible by the system component for training the machine learning model, the data source including information from one or more online brokers pertaining to retail clients.

15. The computer system of claim 8, further comprising a data source accessible by the system component for training the machine learning model, the data source including information related to leads that is generated by financial advisors.

16. The computer system of claim 8, further comprising a strategic feed database that consolidates data sources into a number of accessible and centralized tables.

\* \* \* \* \*

UNITED STATES PATENT AND TRADEMARK OFFICE
CERTIFICATE OF CORRECTION

| | | |
|---|---|---|
| PATENT NO. | : 12,033,216 B1 | Page 1 of 1 |
| APPLICATION NO. | : 18/320752 | |
| DATED | : July 9, 2024 | |
| INVENTOR(S) | : Ankita Joshi et al. | |

It is certified that error appears in the above-identified patent and that said Letters Patent is hereby corrected as shown below:

In the Claims

In Claim 14, Column 10, Line 56, please change "The computer system of claim 8, method of claim 1, further comprising" to:
--The computer system of claim 8, further comprising--

Signed and Sealed this
Twelfth Day of August, 2025

Coke Morgan Stewart
*Acting Director of the United States Patent and Trademark Office*